(No Model.) 2 Sheets—Sheet 2.
A. R. FORDYCE.
FIREPROOF CONSTRUCTION.

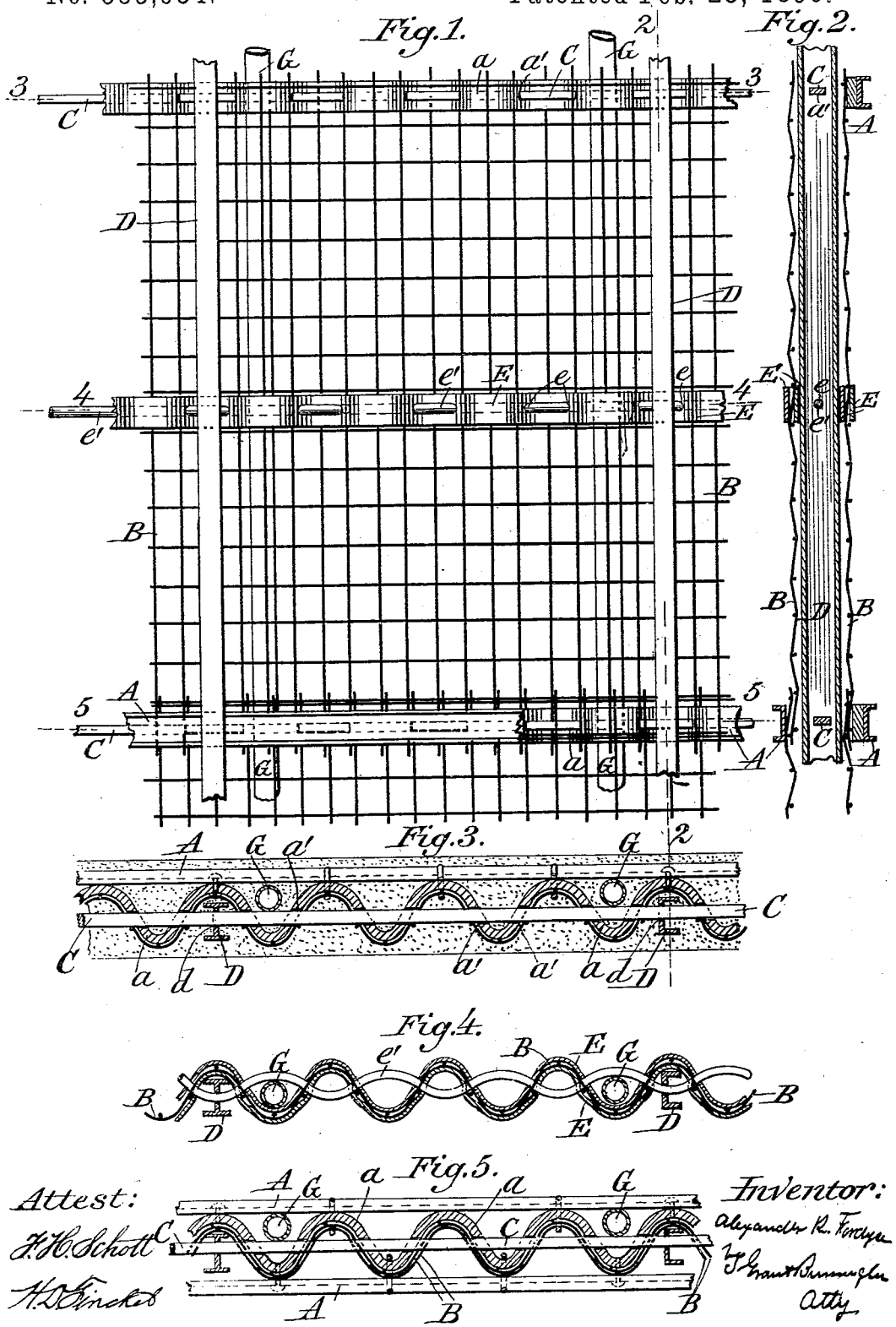
(No Model.) 2 Sheets—Sheet 1.
A. R. FORDYCE.
FIREPROOF CONSTRUCTION.
No. 555,084. Patented Feb. 25, 1896.

No. 555,084. Patented Feb. 25, 1896.

Attest:
F. H. Schott
H. D. Pinckel

Inventor:
Alexander R. Fordyce
by Grant Burroughs
atty.

UNITED STATES PATENT OFFICE.

ALEXANDER R. FORDYCE, OF NEWARK, NEW JERSEY.

FIREPROOF CONSTRUCTION.

SPECIFICATION forming part of Letters Patent No. 555,084, dated February 25, 1896.

Application filed December 5, 1895. Serial No. 571,123. (No model.)

*To all whom it may concern:*

Be it known that I, ALEXANDER R. FORDYCE, a citizen of the United States, residing at Newark, in the county of Essex and State of New Jersey, have invented certain new and useful Improvements in Fireproof Construction, of which the following is a full, clear, and exact description, such as will enable those skilled in the art to which it appertains to make and to use the same.

The invention relates to improvements in fireproof construction, and more particularly to improvements in the framework or supports, whereby the metallic lathing forming the skeleton or foundation for the filling, forming walls, partitions, ceilings, &c., is held in place.

It has for its object the provision of such a construction whereby the lathing can be easily and quickly secured in place, and whereby the entire skeleton or foundation will be firmly united and be able to resist to a considerable degree any force that may be applied to rupture the same.

The invention is especially applicable to those constructions in which the lathing is formed of corrugated metallic plates.

The invention consists in the novel construction, combination and arrangement of parts, such as will be hereinafter fully described, pointed out in the appended claims, and illustrated in the accompanying drawings.

Figure 6:
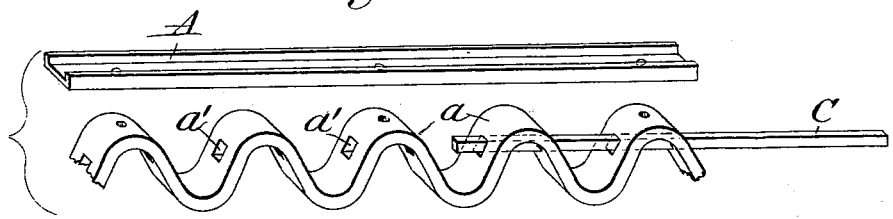
Figure 7:
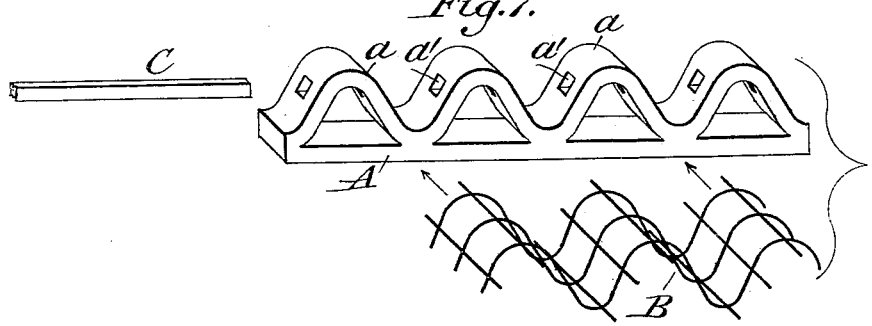
Figure 8:
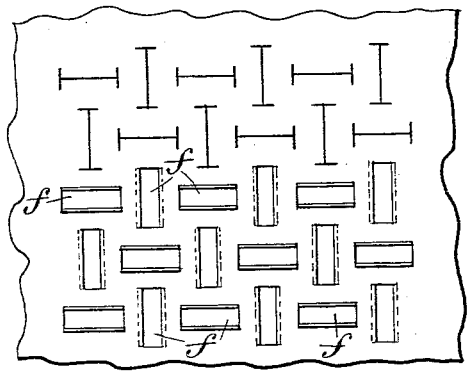
Figure 9:
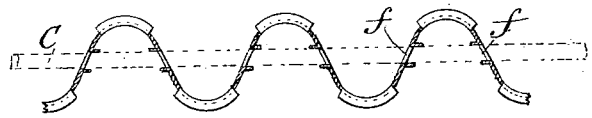

In the accompanying drawings, in which similar letters of reference designate corresponding parts, Figure 1 is an elevation showing a section of a skeleton embodying the invention. Fig. 2 is a section on the line 2 2 of Fig. 1. Fig. 3 is a section on the line 3 3 of Fig. 1. Fig. 4 is a section on the line 4 4 of Fig. 1. Fig. 5 is a section on the line 5 5 of Fig. 1. Fig. 6 is a detail perspective view showing the two members forming the corrugated beam detached. Fig. 7 is a similar view showing a section of the corrugated beam in which the beam proper and its corrugated face are integral. Figs. 8 and 9 are detail views showing a corrugated reticulated metallic plate that is especially adapted to be used with the corrugated beam.

While the invention is especially applicable to be used in a construction in which the lathing is corrugated, and in which application it will be described, it is obvious that other forms of lathing may be used.

Referring to the drawings by letter, A designates a beam provided with a corrugated face $a$. The beam and the face may be cast integrally, as shown in Fig. 7, or they may be made of separate pieces of wrought-iron suitably joined, as by rivets. (See Fig. 6.) The wrought-iron construction is the preferred form, however. The corrugations of the face $a$ are provided with apertures $a'$ $a'$ in a line extending in the general direction of the beam.

To the beam A, of which there may be any desired number as the construction may require, the lathing B is attached. The lathing in this instance is formed of corrugated wire fabric. The dimensions of the corrugations are the same as those of the facing $a$, so that when the latter and the fabric are brought together their respective convolutions will register. After a sheet of lathing has been placed in position on the beam it is secured in place by the locking rod or key C, which is forced through the openings $a'$ $a'$ in the facing $a$ and the meshes of the lathing. In some instances it may be impractical to insert the key in this manner. In such a case it can be placed against the lathing and secured to the beam in any suitable manner and thereby secure the latter in place.

At intervals studs D D are placed. They are contained within the convolutions of the lathing and are provided with apertures $d$ $d$ for the reception of the locking-rods C C.

G G are metallic tubes incorporated in the skeleton for the reception of electric wires, &c.

A modified form of the beam is designated by the letters E E. (See Figs. 1 and 4.) In this instance they are formed of corrugated plates and are generally used in pairs. Each is provided with apertures $e$ $e$. They are placed on opposite sides of the lathing and the three are secured by the locking-rod $e'$. The latter may be straight, as shown in Figs. 3 and 5, or it may be corrugated, as shown in Fig. 4.

Figs. 8 and 9 show a lathing formed of corrugated reticulated metal plate, which is particularly adapted to be used with the corrugated beams. The elongated openings $ff$, extending in opposite directions, are particularly suitable to allow the passage of the locking or tie rod.

Having thus described my invention, what I claim, and desire to secure by Letters Patent, is—

1. In a fireproof construction, the combination of the corrugated beam, the lathing mounted thereon, and the locking-rod securing the lathing to the beam, substantially as described.

2. In a fireproof construction, the combination of the beam having a corrugated face, the lathing mounted on the said face, and the locking-rod securing the lathing to the beam, substantially as described.

3. In a fireproof construction, the combination of the corrugated beam having perforations formed in the projections forming the corrugations, the lathing mounted on the said beam, and the locking-rod registering with the perforations in the beam and the meshes of the lathing, substantially as described.

4. In a fireproof construction, the combination of the corrugated beam, the lathing mounted thereon, and the corrugated locking-rod securing the beam and lathing together, substantially as described.

5. In a fireproof construction, the combination of the perforated corrugated beams, the lathing mounted between the same, and the locking-rod interlacing with the said beams, through the perforations in the latter, and the lathing, substantially as described.

6. In a fireproof construction, the combination of the perforated corrugated beams, the lathing mounted between the same, and the corrugated locking-rod interlacing with the said beams and lathing, substantially as described.

7. A beam consisting of a main plain portion, and the corrugated strip fastened to the same to form a facing, substantially as described.

In testimony whereof I hereunto affix my signature in the presence of two witnesses.

ALEX. R. FORDYCE.

Witnesses:
GRANT BURROUGHS,
J. ROSS COLHOUN.